March 31, 1970          R. K. SUGALSKI          3,503,806

RECHARGEABLE BATTERY OF THE SPIRAL WOUND PLATE TYPE

Filed Sept. 1, 1967

*INVENTOR.*
RAYMOND K. SUGALSKI

BY

ATTORNEY

United States Patent Office 3,503,806
Patented Mar. 31, 1970

3,503,806
RECHARGEABLE BATTERY OF THE SPIRAL
WOUND PLATE TYPE
Raymond K. Sugalski, Gainesville, Fla., assignor to General Electric Company, a corporation of New York
Continuation-in-part of application Ser. No. 597,914, Nov. 30, 1966. This application Sept. 1, 1967, Ser. No. 665,707
Int. Cl. H01m 35/16, 21/00
U.S. Cl. 136—13
6 Claims

ABSTRACT OF THE DISCLOSURE

A cell construction is utilized in which the negative plate edges extend longitudinally beyond the positive plate edges in one direction and the positive plate edges extend longitudinally beyond the negative plate edges in the opposite direction. Terminal straps are attached to the extending edges of the plates at a plurality of points. The plates may be spirally wound and the negative plate connected to a conductive casing through one terminal strap and the positive plate connected to terminal rivet through the remaining terminal strap. As a separate or combined feature a resilient washer having a durometer rating the range of from 15 to 95 may be positioned adjacent either or both ends of the plates.

This invention relates to sealed batteries and more particularly to sealed batteries of the spiral wound plate type and a method of assembling the same. This application is a continuation-in-part of my earlier filed application Ser. No. 597,914, filed Nov. 30, 1966, now abandoned.

Prior batteries of this type have not been well adapted to automatic and economic assembly since the battery coil or plates must be provided with discrete individual connector means which will electrically connect the electrodes of the battery to a positive pole and to the casing in which the battery is enclosed (the negative pole). The making of these connections has not been readily adaptable to automatic production and therefore it is a primary object of the invention to provide an improved structure for batteries of this type which is readily adaptable to production on automatic type equipment.

Prior batteries of this type have normally been provided with an insulative cap means in which is mounted a positive terminal and a resealable vent means. After connection of the terminal to the battery coil this cap means has been sealed to the casing of the battery by a rolling or crimping operation. This rolling or crimping operation has required a thicker material for the casing than would be otherwise required merely for enclosing the battery constituents and also created a potential leakage path at any point on the circumference of the cap. Another object of the invention, therefore, is to provide a battery which may be constructed without a rolling or crimping operation.

These and other objects of the invention which will be understood from the following complete specification and drawings are accomplished by providing a sealed rechargeable battery which comprises a generally tubular casing having an open end and an integral end wall in which resealable venting means and the positive terminal means are centrally mounted. The battery coil having a pair of electrode connector means is mounted within the casing having one connector connected to the positive terminal and the other connector being secured between the open end of the casing and a cap means which sealingly closes the open end. The cap means may be readily secured in the open end of the casing by suitable means, preferably by automatic welding techniques.

Figure 1:
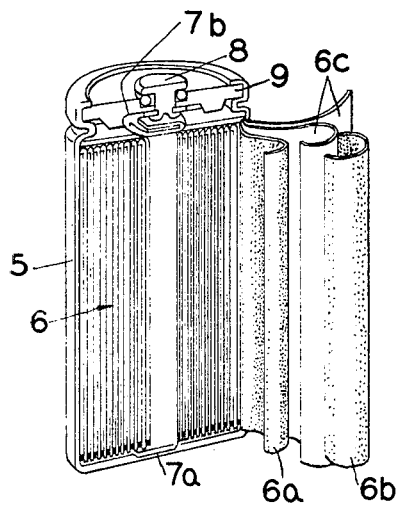
Figure 3:
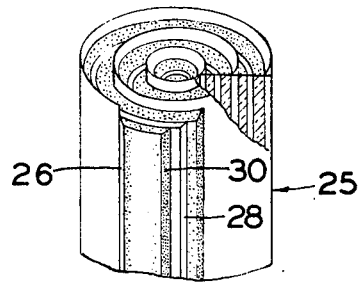
Figure 2:
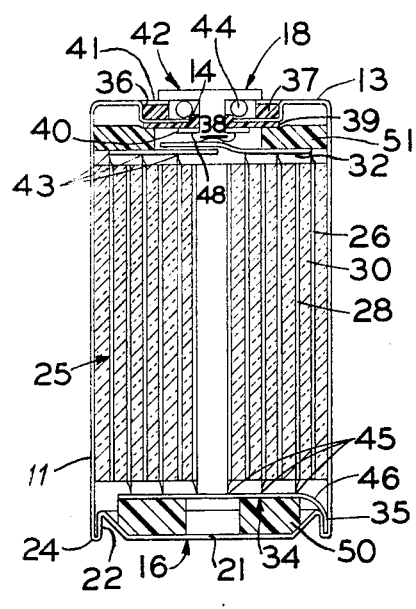

Further objects and advantages of the invention will be understood from the following complete specification and drawings wherein: FIG. 1 shows a cross-sectional perspective view of a prior art battery of the type to which the invention relates; FIG. 2 is a cross-sectional view of a battery embodying the invention; FIG. 3, a perspective view of the battery coil therefor; and FIG. 4, a perspective of the battery coil with the connector terminal strap thereon.

As shown in FIG. 1, a prior art battery of the type to which the invention relates has been conventionally constructed of a nickel-plated steel casing 5 in which is contained a battery coil 6. The battery coil 6 consists of a positive plate 6a and a negative plate 6b separated by separator insulative layers 6c which are wound together to form the battery coil 6. A tab 7a connected to or integral with the negative plate 6b is secured to the bottom of the case 5 and another tab 7b connected to or integral with the positive plate 6a is secured to a positive terminal 8 located in a cover member 9 of insulative material. The cover member 9 has been sealed to the casing 5 by crimping upper end thereof about the cover as shown.

As shown in FIG. 2, the construction and also the overall appearance of the battery has been improved by elimination of the insulative cover member and the crimping of the case thereto. This is accomplished by constructing the battery with the case of the battery comprising a generally tubular casing 11 closed at its upper end by an integral recessed end wall 13 having a central opening 14. The lower end of the casing 11 is closed by closure means 16. The central opening 14 of integral end wall 13 is closed by a positive terminal and a resealable vent means 18 which means operates to relieve excess gas pressure in accordance with the principles set forth in my co-pending application Ser. No. 387,866, filed Aug. 6, 1964, now Patent No. 3,320,097.

The closure means 16 for the open end of the case is a cap which has a generally dish-shaped bottom 21, as viewed in FIG. 2, and an integral peripheral flange 22 extending generally at right angles thereto. The flange 22 closely contacts the interior lower side wall of the casing 11 and is sealingly secured to the casing by a peripheral weld 24 which shall be described in greater detail hereinafter. The battery coil 25 comprises a positive plate 26 and a negative plate 28 spaced apart by separator insulative means 30. Connector terminal strap 32 for the positive plate 26 is connected to the positive terminal means 18 in the top of the casing 11 and a connector terminal strap 34 for the negative plate 28 is entrapped between the cap and the interior side wall of the casing 11, at a joint 35. The casing 11 is provided with a suitable electrolyte.

The end wall 13 of the casing is provided with a depressed area, or recess 36 surrounding the central opening 14. The casing 11, to withstand the pressures encountered during operation of the battery and to withstand the corrosive effects of the electrolyte contained therein, is composed of a nickel-plated steel as in the prior art. However, since the crimping of the case to the insulative cover of the prior art (shown in FIG. 1) is no longer required, the material used in manufacture of the case may be of thinner, e.g., .012", material as compared to the thicker, e.g., .019", material customarily used. The crimped seal to the insulative cover made it necessary to anneal the steel so as to get a proper ductility to the steel to form the crimp. Annealed steel is no longer required in construction of batteries in accordance with the present invention.

The resealable vent and positive terminal means 18 is comprised of outer and inner insulative washers 37 and 39, respectively on either side of the recessed portion 36 of the end wall 13 and surrounding the central opening 14. A headed rivet member 38, acting in conjunction with a washer member 40 secures the two insulative washers 37 and 39 concentric to the central opening 14 of the casing, the head 42 of the rivet 38 serving as the positive terminal of the battery. An O-ring 44 is provided in the space between the rivet head 42 and the outer support washer 37 and operates as a resealable vent in accordance with the principles set forth in the aforementioned co-pending application by forming a seal between the underside of rivet head 42 and bottom of recessed portion 36. Suitable slots 41 are provided in the inner and outer insulative washers 39 and 37 to provide venting routes for the gasses developed during operation of the battery. While the resealable vent means operates in accordance with the same principles as the aforesaid application, it will be noted that the present construction of the vent means eliminates the circumferential crimp which poses a potential leak problem.

The battery coil 25, shown in greater detail in FIG. 3, is wound so that the positive plate 26 is offset to the top of the battery as viewed in the drawing and the negative plate 28 is offset to the bottom of the battery, the separator layers 30 extending the distancee between the plates from the upper edge of the negative plates to the lower edge of the positive plates. This construction offers several advantages, the primary one being the ease of connection of the connector leads to the respective battery plates. The prior art construction connected a tab 7a or 7b, usually a single tab for each plate, or was made an integral part of the plate. With the construction in accordance with the invention, terminal straps 32 and 34 may be connected at respective ends of the coil 25 after winding thereof because only one of the plates is exposed at either edge. Not only can the terminal straps 32 and 34 to the battery electrodes be connected after coiling thereof, but the making of multiple connections to the turns of the battery plates with a plurality of welds 43 and 45 greatly increases the rate at which the battery may be discharged by providing ohmic connections at several points along the length of each of the plates. By connection of the terminal strap 32 over the end of the coil 25 as best viewed in FIG. 4, the coil 25 is given much greater strength and rigidity. Connector strap 34 may be similar in construction to that of strap 32. Since the positive plates 26 only extend upwardly toward the positive terminal strap 32 and the negative plates 28 only extend downwardly toward the bottom of the case, insulating spacer members required at the ends of the coil in the prior art construction may be eliminated.

The elimination of these insulating spacers not only eliminates the cost of the same, but also provides more space within the casing for the electrolyte, active plate material and the recombination of the gases which are formed during operation of the battery. The consruction of case 11 with the integral top wall 13 recessed to receive the positive terminal means 18 also provides extra space within the battery casing (for any given size of battery) since the relatively thick insulative cover 9 of the prior art construction has now been eliminated. Thus, the present construction offers more space within the casing 11 than the prior art construction. Although the releasable vent means 18 is provided on the casing, it is desirable that the gases produced during the operation do not escape to the atmosphere since this, in effect, reduces the amount of electrolyte remaining in the cell, hence reducing the total capacity of the battery.

Where the battery is intended to be used under conditions of extreme shock and vibrations, it is desirable that the battery coil 25 be restrained against movement within the case by use of spacers 50 and 51 which are formed of a material having sufficient resiliency to permit clamping of the battery coil between the ends of the case 11. The material preferably has a durometer hardness of from 15–95, with 40–60 being preferred for most applications. Any resilient material which is chemically inert toward the electrolyte used in the cell construction may be utilized. Rubbers having good acid and base resistance are ethylene-propylene rubbers, neoprene, and fluorinated rubbers. Where a material in the form of a solid spacer is too hard for use, it is anticipated that it may be used as a foam. For example, it is anticipated that foamed rubbers may be utilized in applications where extreme shocks or vibrations may be encountered. Polystyrene, polyethylene, and polypropylene are examples of materials that may be utilized effectively as foams.

Figure 4:
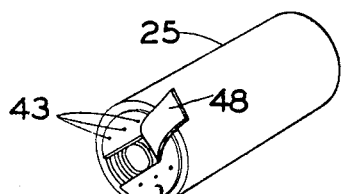

In accordance with the invention, the battery may be now constructed by forming the primary body 11 and the cap member 21 out of suitable steel. No annealing of the case material is now required, and as pointed out above, thinner material may now be utilized because the crimping operation has been eliminated. The positive terminal and resealable vent means 18 may then be assembled, surrounding the central opening 14 of the recessed end wall 13 of the casing 11 by placing the respective insulative washers 37 and 39 on either side of the central opening and securing the rivet 38, O-ring 44, and washer 40 together. The battery coil 25, being wound in the offset manner as aforestated, may be provided with the connector terminal straps 32 (as shown in FIG. 4) and 34 on opposite ends of the coil. The positive terminal strap 32 is provided with a tab portion 48 while the negative tap strap 34 is provided with the tab end 46. The coil 25 is then inserted into the open end of the casing 11, and using a properly elongated welding rod (not shown), the central portion 48 of the tap strap 32 is connected to the positive terminal means 18 by welding. The tab end 46 of the negative tap strap 34 is folded over the open outer end edge of the casing prior to placement of the closure means 16 in the open end of the casing. The casing may then be filled with the battery electrolyte, and the closure means 16 placed in the open end of the casing entrapping the end 46 of the negative terminal tap strap 34. A peripheral weld 24 is made between the edge of the main body 11 of the casing and the edge of the peripheral flange 22.

While the use of resilient spacers such as 50 and 51 has been discussed with particular reference to the novel cell construction shown in FIGURE 2, it is recognized that my inventive use of resilient spacers to prevent damage to cells of the type described due to extreme shocks or vibrations may be applied to cells of conventional construction. For example, it is anticipated that resilient spacers could be conveniently mounted in compression between the battery coil 6 and the cover member 9 shown in FIGURE 1. (Also, a washer could be mounted between the casing 5 and the lower end of the battery coil). With reference to the novel cell construction of FIGURE 2, it is apparent that either spacer 50 or 51 or both could be omitted without departing from the teachings of my invention. Additionally it is noted that the battery coil 25 could be substituted for the battery coil 6 in FIGURE 1 without departing from my teachings.

Thus it will be understood that there is provided a battery which is readily adaptable to production on automated equipment, is economical to manufacture and provides greater casing capacity. While the invention has been described in terms of the preferred embodiment thereof, it will be understood that changes can be made therein without departing from the spirit and scope of the invention as set forth in the appended claims.

What is claimed as new and desired to be secured by Letters Patent is:

1. A rechargeable battery comprising a generally tubular casing having one end closed by an integral end wall extending across a major portion of said casing, said integral wall having a central opening; terminal and resealable vent means mounted in and closing said central opening; cap means fixed to said tubular casing and defining a closure for the other end of said casing; a battery coil within said casing and having two electrode connector means; said battery coil comprising a pair of battery plates and an insulative separator wound therein between, said plates being longitudinally offset from each other so that one of said plates extends beyond the separator in one direction defining a plurality of exposed edges of said one plate and the other plate extending beyond the separator defining a plurality of exposed edges of said other plate in the other direction, said electrode connector means including terminal strap means connected to a plurality of at least some of said exposed edges; electrolyte within said casing; and means for connecting one of said electrode connector means to said terminal and resealable vent means for connecting the other of said electrode connector means between said cap means and a portion of said casing.

2. A rechargeable battery as recited in claim 1 wherein said end wall is formed with a recess and said terminal and resealable vent means comprises a pair of insulative washers surrounding said central opening and disposed on respective opposite sides of said end wall, one of said pair of washers being disposed within said recess, an O-ring disposed around said central opening, and a headed rivet securing said washers and said O-ring to said end wall.

3. A rechargeable battery as recited in claim 1, further including resilient restraining spacer means provided between the ends of said battery coil and said end wall and cap means respectively of said casing for cushioning said coil with respect to vibration and impact, said resilient restraining spacer means comprising an insulating spacer having a durometer hardness in the range of from 15 to 95.

4. A battery as recited in claim 1 wherein said terminal strap means includes a first and second terminal strap secured respectively to a plurality of said exposed end edges of said one battery plate and of said other battery plate.

5. A rechargeable battery according to claim 3 in which said resilient restraining spacer means has a durometer value of approximately 50.

6. A battery as recited in claim 4, said cap means and said tubular casing together defining a joint where said cap means is fixed to said tubular casing, and means securing said second terminal strap to said casing at said joint.

References Cited

UNITED STATES PATENTS

| | | | |
|---|---|---|---|
| 1,370,056 | 3/1921 | Schulte | 136—175 |
| 2,422,046 | 6/1947 | Ruben | 136—107 |
| 2,487,499 | 11/1949 | Webb | 136—13 |
| 2,536,699 | 1/1951 | Ruben | 136—107 |
| 3,114,659 | 12/1963 | Warren | 136—178 |
| 3,288,642 | 11/1966 | Kordesch | 136—14 |
| 3,293,081 | 12/1966 | Daley | 136—178 |
| 3,320,097 | 5/1967 | Sugalski | 136—178 |

ALLEN B. CURTIS, Primary Examiner

A. SKAPARS, Assistant Examiner

U.S. Cl. X.R.

136—69, 107, 177